US010896191B2

(12) United States Patent
Hamilton et al.

(10) Patent No.: US 10,896,191 B2
(45) Date of Patent: *Jan. 19, 2021

(54) CREATION OF REAL-TIME CONVERSATIONS BASED ON SOCIAL LOCATION INFORMATION

(71) Applicant: Facebook, Inc., Menlo Park, CA (US)

(72) Inventors: Ben Hamilton, Santa Clara, CA (US); Lucy Congyun Zhang, Palo Alto, CA (US); Benjamin Peter Davenport, Palo Alto, CA (US); Jonathan David Perlow, San Francisco, CA (US); David Harry Garcia, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 567 days.

This patent is subject to a terminal disclaimer.

(21) Appl. No.: 15/217,926

(22) Filed: Jul. 22, 2016

(65) Prior Publication Data

US 2016/0335271 A1 Nov. 17, 2016

Related U.S. Application Data

(63) Continuation of application No. 13/544,368, filed on Jul. 9, 2012, now Pat. No. 9,412,136.

(51) Int. Cl.
*G06Q 10/10* (2012.01)
*H04L 12/58* (2006.01)
(Continued)

(52) U.S. Cl.
CPC .......... *G06F 16/252* (2019.01); *G06F 3/0482* (2013.01); *G06F 16/287* (2019.01);
(Continued)

(58) Field of Classification Search
CPC combination set(s) only.
See application file for complete search history.

(56) References Cited

U.S. PATENT DOCUMENTS 7,454,475 B1 11/2008 Coleman
7,765,265 B1 * 7/2010 Granito ............... G06Q 10/107
707/999.003

(Continued)

OTHER PUBLICATIONS

United States Office Action, U.S. Appl. No. 13/544,368, dated Jun. 29, 2015, 13 pages.

(Continued)

*Primary Examiner* — Aaron N Strange
(74) *Attorney, Agent, or Firm* — Fenwick & West LLP (57) ABSTRACT

A social networking system determines common location information included in a set of posts between a set of users. Using the determined common location information, the social networking system generates a message interface for grouping a set of messages into a conversation thread. For example, the messages may be grouped into a conversation thread based on common location information in the messages and being associated with participants sharing a social relationship. When a group conversation is created, the social networking system presents a message interface containing the conversation thread to one or more participants of the thread. The social networking system adds the set of messages to the conversation thread based on social information about the social relationships among the participants of the conversation thread. The social networking system then presents the message interface for display to one or more of the participants.

17 Claims, 5 Drawing Sheets

(51) Int. Cl.
*G06Q 50/00* (2012.01)
*G06F 3/0482* (2013.01)
*G06F 16/25* (2019.01)
*G06F 16/28* (2019.01)
*G06F 16/9537* (2019.01)

(52) U.S. Cl.
CPC ....... *G06F 16/9537* (2019.01); *G06Q 10/107* (2013.01); *G06Q 50/01* (2013.01); *H04L 51/16* (2013.01); *H04L 51/20* (2013.01); *H04L 51/32* (2013.01)

(56) References Cited

U.S. PATENT DOCUMENTS

| | | | |
|---|---|---|---|
| 8,045,455 B1 | 10/2011 | Agronow et al. | |
| 8,892,666 B1 | 11/2014 | Jackson et al. | |
| 2006/0112392 A1* | 5/2006 | Zhang | H04L 51/26 718/102 |
| 2007/0043846 A1 | 2/2007 | Grayson et al. | |
| 2007/0078938 A1* | 4/2007 | Hu | H04L 51/08 709/206 |
| 2007/0282956 A1* | 12/2007 | Staats | H04L 51/34 709/206 |
| 2007/0293212 A1* | 12/2007 | Quon | H04M 3/42365 455/420 |
| 2008/0098313 A1* | 4/2008 | Pollack | G06F 3/048 715/753 |
| 2008/0229236 A1* | 9/2008 | Carrer | G06F 17/30961 715/786 |
| 2009/0164431 A1* | 6/2009 | Zivkovic | G06F 17/278 |
| 2009/0182823 A1* | 7/2009 | O'Sullivan | H04L 51/26 709/206 |
| 2009/0193095 A1 | 7/2009 | Coleman | |
| 2009/0305730 A1* | 12/2009 | Herz | H04L 51/38 455/466 |
| 2009/0319619 A1* | 12/2009 | Affronti | G06Q 10/107 709/206 |
| 2010/0087169 A1 | 4/2010 | Lin et al. | |
| 2010/0287286 A1* | 11/2010 | Bustamente | H04L 63/0407 709/228 |
| 2010/0318622 A1 | 12/2010 | Granito et al. | |
| 2011/0010182 A1 | 1/2011 | Turski et al. | |
| 2011/0055930 A1* | 3/2011 | Flake | G06F 21/6245 726/27 |
| 2011/0161987 A1 | 6/2011 | Huang et al. | |
| 2011/0196922 A1 | 8/2011 | Marcucci et al. | |
| 2011/0202668 A1* | 8/2011 | Tarrago | H04L 63/0823 709/228 |
| 2011/0238755 A1* | 9/2011 | Khan | H04W 4/21 709/204 |
| 2011/0238766 A1* | 9/2011 | Lew | H04L 29/12896 709/206 |
| 2011/0246463 A1 | 10/2011 | Carson et al. | |
| 2011/0314017 A1* | 12/2011 | Yariv | G06Q 30/02 707/737 |
| 2012/0005221 A1* | 1/2012 | Ickman | G06F 16/24575 707/769 |
| 2012/0047448 A1 | 2/2012 | Amidon et al. | |
| 2012/0079099 A1* | 3/2012 | Dhara | G06Q 10/107 709/224 |
| 2012/0102050 A1 | 4/2012 | Button et al. | |
| 2012/0124147 A1* | 5/2012 | Hamlin | H04L 51/36 709/206 |
| 2012/0124458 A1 | 5/2012 | Cruzada | |
| 2012/0166367 A1* | 6/2012 | Murdock | G06Q 30/02 706/12 |
| 2012/0179980 A1 | 7/2012 | Whalin et al. | |
| 2012/0221962 A1* | 8/2012 | Lew | H04L 29/12896 715/752 |
| 2012/0239761 A1 | 9/2012 | Linner et al. | |
| 2012/0246266 A1 | 9/2012 | Mallet et al. | |
| 2012/0259925 A1* | 10/2012 | Braudes | H04L 51/16 709/206 |
| 2012/0270563 A1 | 10/2012 | Sayed | |
| 2012/0291110 A1* | 11/2012 | Park | G06F 21/60 726/7 |
| 2012/0317210 A1* | 12/2012 | Fisher | H04L 51/16 709/206 |
| 2012/0323909 A1* | 12/2012 | Behforooz | G06Q 50/01 707/728 |
| 2013/0027428 A1 | 1/2013 | Graham et al. | |
| 2013/0097246 A1 | 4/2013 | Zifroni et al. | |
| 2013/0124189 A1 | 5/2013 | Baldwin | |
| 2013/0173531 A1 | 7/2013 | Rinearson et al. | |
| 2013/0173729 A1 | 7/2013 | Starenky et al. | |
| 2013/0212185 A1 | 8/2013 | Pasquero et al. | |
| 2013/0218885 A1* | 8/2013 | Satyanarayanan | G06Q 30/016 707/728 |
| 2013/0254309 A1 | 9/2013 | Jackson et al. | |
| 2013/0254312 A1 | 9/2013 | Maheshwari et al. | |
| 2013/0282810 A1 | 10/2013 | Lessin et al. | |
| 2013/0282813 A1* | 10/2013 | Lessin | G06Q 10/063 709/204 |
| 2013/0325975 A1 | 12/2013 | Drews et al. | |
| 2013/0339358 A1 | 12/2013 | Huibers et al. | |
| 2014/0136521 A1 | 5/2014 | Pappas | |

OTHER PUBLICATIONS

United States Office Action, U.S. Appl. No. 13/544,368, dated Oct. 31, 2014, 12 pages.
United States Office Action, U.S. Appl. No. 13/544,368, dated Feb. 5, 2014, 8 pages.

* cited by examiner

CREATION OF REAL-TIME CONVERSATIONS BASED ON SOCIAL LOCATION INFORMATION

CROSS-REFERENCE TO RELATED APPLICATIONS

This application is a continuation of co-pending U.S. patent application Ser. No. 13/544,368, filed Jul. 9, 2012, which is hereby incorporated by reference in its entirety.

BACKGROUND

This disclosure relates generally to social networking systems, and more specifically to a social networking system that organizes and presents messages as a conversation based on location information.

Social networking systems provide various electronic message channels to allow users to share information, including status updates including a current location of a user, or plans to attend a social event. For example, users can share information by updating their status, posting to another user's wall, or messaging a user using web-chat.

But the flexibility provided by sharing information using a variety of communication channels within the social networking system can create challenges for a user to discover related messages from other users with whom the user is connected to. For example, a user sharing messages over web-chat about attending a social event may be unaware of posts received from other users indicating an interest in attending the same social event, because the posts were buried in a listing of several unrelated posts from other users. In another example, a user may simply discover a message regarding the event too late. Thus, for many users of a social networking system, manually sorting through hundreds of messages in real-time to identify, group, and create messages associated with particular social information would be impractical.

SUMMARY

Embodiments of the invention facilitate the creation of real-time conversations based on social and location information. The creation of the real-time conversation may be triggered by and created based on posted content associated with a location. In an embodiment, the social networking system determines common location information from a set of posts between a set of users. Using the determined common location information, the social networking system generates a message interface for grouping a set of messages into a conversation thread. For example, the messages may be grouped into a conversation thread based on common location information in the messages and being associated with participants sharing a social relationship. When a group conversation is created, the social networking system presents a message interface containing the conversation thread to one or more participants of the thread. The social networking system adds the set of messages to the conversation thread based on social information about the social relationships among the participants of the conversation thread. The social networking system then presents the message interface for display to one or more of the participants.

The figures depict various embodiments of this disclosure for purposes of illustration only. One skilled in the art will readily recognize from the following discussion that alternative embodiments of the structures and methods illustrated herein may be employed without departing from the principles of this disclosure.

DETAILED DESCRIPTION

Figure 1:
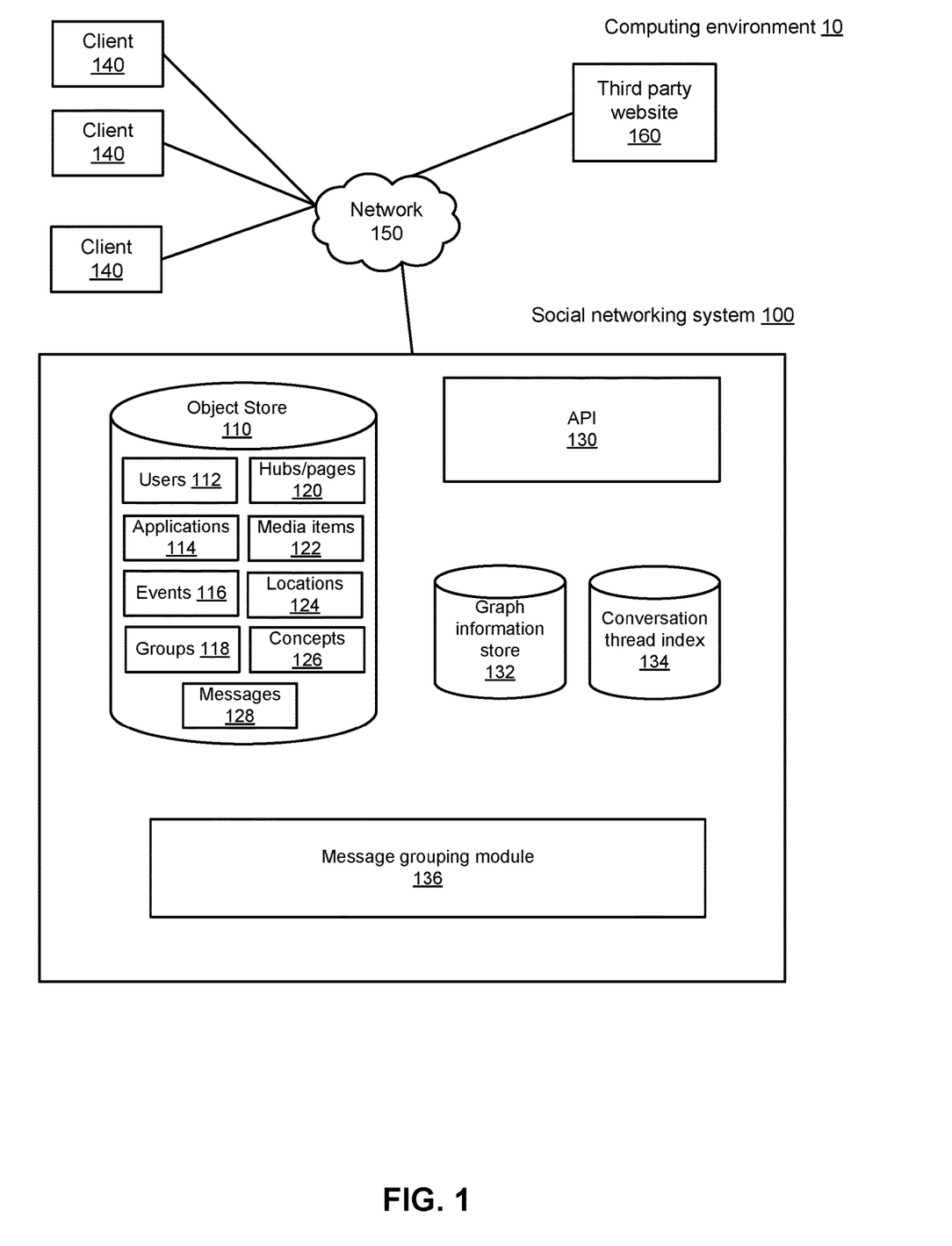
FIG. 1 illustrates a high-level block diagram of a computing environment for social networking, according to one embodiment.

FIG. 1 is a high-level block diagram of a computing environment 10 for social networking according to an embodiment. The computing environment 10 includes a social networking system 100, multiple client devices 140, and third party website 160 coupled to communication using network 150. Social networking system 100, client devices 140, and third party website 160 each comprise of one or more computers. Additionally, client devices 140 may comprise any other type of computing device, such as a mobile phone, laptop, netbook, tablet, set top box, television, in-vehicle infotainment system, etc.

A user of social networking system 100 uses client device 140 to interact with social networking system 100 via an application, such as a web browser or a native application, to perform operations such as browsing content, posting and sending messages, retrieving and sorting messages received from other users, and the like. The application may load a message interface provided by social networking system 100 to send and receive messages. Messages can be sent or received through different electronic message channels/formats. Generally speaking, a social networking channel is any technology that may be used for delivering electronic messages to a user of the social networking system. Examples of social networking channels include web-chat (e.g., a chat application of a web-page hosted by social networking system 100), e-mail, extensible social networking and presence protocol (XMPP), short message service (SMS) texting and mobile chat (e.g., via an application installed on a mobile client 140). Messages may contain plain text, or other content such as an image, video, audio, or other attachment.

In an embodiment, social networking system 100 comprises an object store 110, graph information store 132, application programming interface (API) 130, conversation thread index 134, and message grouping module 136. Through API 130, third party website 160 may interact with the social networking system 100. For example, in an embodiment, third party website 160 performs operations supported by API 130, such as delivering messages to social networking system 100, retrieving messages stored by social networking system 100, and obtaining social information about users of social networking system 100. Social information about users of social networking system 100 includes information describing relationships among users and interactions of users with other users and objects on social networking system 100. Interactions of users with objects on social networking system 100 include historical information, such as a previous check-in at a location, tagging a photo, sharing a link, or indicating a preference for an object (e.g., liking a band, a song, a video, a merchant location, etc.).

Object store 110 stores information on various objects of social networking system 100. These objects represent a variety of things with which a user of social networking system 100 may interact in social networking system 100, including, without limitation, other users (e.g., user objects 112) of social networking system 100 (represented, e.g., as a profile object for the user), application objects 114 (e.g., a game playable within social networking system 100), event objects 116 (e.g., a concert that a user attends, plans to attend, or is invited to attend), group objects 118 to which users may belong, page or hub objects 120 (e.g., pages constituting a particular organization's presence on the system), media item objects 122 (e.g., pictures, videos, audio, text, or any other type of media content), location objects 124 associated with a user (e.g., "Santa Clara, Calif., USA"), and even concept objects 126 or other terms (e.g., "monetary policy"). Object store 110 may further store objects representing other data routinely produced by users of social networking system 100, such as message objects 128, status updates, photos, and videos.

Message objects 128 includes content and metadata associated with a message, such as a, web-chat, SMS message, e-mail, or post. A post includes any content or information received from the user that indicates a location, including check-ins, photos with tagged locations, invitation to attend an event, etc. Content may include text, images, video, or references to other content. Metadata may include location information, temporal information, or network information associated with the sender or recipient, or any component of the communication channel associated with transmitting or receiving the message. Location information includes information as specific as latitude and longitude coordinates, street address, entity name (e.g., Yoshi's San Francisco), event (e.g., Carnival, Louis' New Years Eve party, Burning Man, Sturgis, etc.), or structure (e.g., Golden Gate Bridge, Coit Tower, or Eifel Tower). Location information also includes information as broad as a country, city, or geographic region (e.g., Isla de San Andres, or Pacific Northwest).

An object in object store 110 may represent a business entity. In an embodiment, the business entity creates a page on social networking system 100 to enable users of social networking system 100 to express interest in web pages hosted on third party websites 160 external to social networking system 100. For example, pages may be represented as page objects in social networking system 100 as a result of embedding a widget, social plug-in, programmable logic or code snippet into the webpage such as an inline frame ("iframe").

Object store 110 also stores metadata associated with the objects, such as a name describing the object (e.g. "Charles Williams" for a person, "Birthday Reminder" for an application, or "Lowell High School San Francisco Alumni" for a group), an image representing the object (e.g., a user or entity profile picture), one or more labels assigned to the object by users (e.g. the textual strings "game", "crime", and "strategy" for a strategy game application), or different e-mail addresses of a user object (e.g., "jeremy1234@gmail.com" and "jeremy1234@yahoo.com"). Different types of objects may have different types of metadata, such as a set of associated user objects 112 for a group object 118, a media type (e.g., "video") for media item object 122, and a unique user ID and name tokens (e.g., separate first and last names "Charles" and "Williams") for user object 112.

Graph information store 132 stores information on the relationships of the objects in object store 110. In an embodiment, graph information store 132 represents the objects of object store 110 as nodes that are linked together in a "social graph." A social graph includes nodes connected by edges stored on social networking system 100. Nodes include users and objects of social networking system 100, such as web pages embodying concepts and entities, and edges connect the nodes. Any concept that can be embodied in a web page may become a node in the social graph. As a result, users may interact with many objects external to social networking system 100 that are relevant to a keyword or keyword phrase, such as "Cowboys Stadium." Social networking system 100 records each of the interactions with an object relevant to keyword or keyword phrase as an edge. For example, using keyword phrase "Cowboys Stadium," interactions may include a user purchasing tickets to attend the 2012 Cotton Bowl, attaching an image or video of highlights from a Dallas Cowboys football game to a message, a user message discussing where to park for an upcoming Dallas Cowboys game, or a user message inviting a connected user to attend an informal get together to watch a Dallas Cowboys game at a user's home.

Edges represent a particular interaction between two nodes, such as when a user expresses an interest in a news article shared by another user about "America's Cup." The social graph may record interactions between users of social networking system 100 as well as interactions between users and objects of social networking system 100 by storing information in the nodes and edges that represent these interactions.

Various examples of edges in the social graph include: an edge between two user objects representing that the users have a relationship in social networking system 100 (e.g., are friends, or have communicated, viewed the other's profile, or interacted in some way), an edge between a user object and an application object representing that the user has used the application, an edge between a user object and a group object representing that the user belongs to the group, and an edge between a user object and a page object representing that the user has viewed the page, to name just a few. For example, if one user establishes a relationship with another user in the social networking system, the two users are each represented as a node, and the edge between them represents the established relationship; the two users are then said to be connected in the social network system. Continuing this example, one of these users may send a message to the other user within the social networking system. This act of sending the message is another edge between those two nodes, which can be stored and/or logged by the social networking system. The message itself may be treated as a node.

In another example, one user may tag another user in an image that is maintained by the social networking system. This tagging action may create edges between the users as well as an edge between each of the users and the image, which is also a node. In yet another example, if a user confirms attending an event, the user and the event are nodes, where the indication of whether or not the user will attend the event is the edge.

In yet another example, if a user confirms attending an event, the user and the event are nodes, where the indication of whether or not the user will attend the event is the edge. Using a social graph, therefore, a social networking system may keep track of many different types of objects and edges (the interactions and connections among those objects), thereby maintaining an extremely rich store of socially relevant information.

Custom graph object types and graph action types may be defined by third-party developers as well as administrators of the social networking system to define attributes of the graph objects and graph actions. For example, a graph object for a movie may have several defined object properties, such as a title, actors, directors, producers, year, and the like. A graph action type, such as "purchase," may be used by a third-party developer on a website external (e.g., third party website 160) to social networking system 100 to report custom actions performed by users of social networking system 100. In this way, the social graph may be "open," enabling third-party developers to create and use the custom graph objects and actions on external websites.

In an embodiment, edges in graph information store 132 have associated metadata, such as a label describing the type of relationship (e.g., "friend" as the label between two user objects, "family" as the label between brother and sister), or an affinity value quantifying the strength of the relationship. Affinity may be determined, for example, from positive and negative interactions between two objects. Further, a relationship degree, or "distance," between any two objects can be ascertained by determining the number of edges on the shortest path between the objects. For example, two user objects that have an edge between them (e.g., denoting a friendship relationship) have a relationship degree (or "distance") of one and are considered first-order connections. Similarly, if a user object A is a first-order connection of user object B but not of user object C, and B is a first-order connection of C, then objects A and C have a relationship degree of two, indicating that C is a second-order connection of A (and vice-versa).

In an embodiment, social networking system 100 adds information to graph information store 132 when it observes events taking place indicating relationships between the various objects, such as a user object 112 interacting with an event object 116. Alternatively and/or additionally, graph information store 132 may be created based on existing stored information from which relationships can be inferred. For example, the friend list of a user object 112 might indicate that the user has a friend relationship with another user, or the data for group object 118 might indicate that some set of users has a membership relationship with that group, and this information could be reflected in graph information store 132.

Conversation thread index 134 stores information about a large number of "conversation threads." Each conversation thread is associated with a collection of posts that include common location information sent between the participants of the conversation thread. For example, one conversation thread may include messages discussing preference for particular restaurant sent between user Adam and user Bob, and messages sent between user Bob and user Charlie, discussing plans to visit the restaurant. In this example, Adam and Bob are connected as friends, and Bob and Charlie are also connected as friends. Adam and Charlie, however, are not connected as friends. From Adam's perspective, a conversation thread concerning the restaurant includes messages exchanged between Bob and Charlie because the subject matter of their message concerns the restaurant and because Adam's social proximity with Bob and Charlie. That is, Adam is a first-order connection of Bob, but not of Charlie. Bob is a first-order connection of Charlie, which makes Adam a second-order connection of Charlie (and vice-versa).

In an embodiment, social networking system 100 stores message objects 128 in object store 110. Conversation thread index 134 links each conversation thread to message objects 128 that are part of a conversation thread. As conversation threads can include many message objects 128, each conversation thread may be linked to several different message objects 128. Other information stored in conversation thread index 134 for each thread may include, for example, participants of the thread, a folder or category (e.g., location or event) that the thread belongs to, a state of the thread, timestamps of the posts in the thread, an electronic message channel associated with each post, as well as other types of information that are appropriate for indexing.

Message grouping module 136 accesses conversation thread index 134 to retrieve information about conversation threads, update information about conversation threads, and to generate new conversation threads. Message grouping module 136 may also access object store 110 and graph information store 132 to retrieve information about the objects of social networking system 100. Additionally, message grouping module 136 receives, organizes, and presents messages to/from users of social networking system 100 via an interactive message interface. The message interface can be, for example, a webpage that is viewed by a user at a client device 140 with a web browser.

The functionality provided by message grouping module 136 is described in greater detail in conjunction with FIGS. 2-5. Examples of the functionality provided by message grouping module 136 include organizing messages into conversation threads using location information and social network information, providing a reply interface, adding contextual information to messages, among others.

Organizing Messages into Conversations

In an embodiment, message grouping module 136 aggregates messages into conversation threads that include messages sent between connected users of social networking system 100 that include content associated with common location information. For example, assume that Adam and Bob are connected users of the social networking system 100. If Adam sends a message to Bob inviting Bob to attend a sporting event with Adam, and Bob replies to Adam indicating that he would like to attend the event, message grouping module 136 creates a new conversation thread in conversation thread index 134 to capture the discussion about the sporting event. Each time Adam or Bob exchange messages concerning the sporting event, message grouping module 136 adds the new message to the existing "sporting event" conversation thread. Also, each time another users connected to Adam or Bob posts a message, that message is also added to the existing "sporting event" conversation thread.

More generally, message grouping module 136 creates a conversation thread from a plurality of messages that share common location and social information, which are exchanged by a threshold number of users over a predetermined threshold period of time. For example, message grouping module 136 may create a conversation thread when at least four messages that include common location information (e.g., discuss plans to go hiking at a local park) are exchanged between at least three users that share a social connection over a thirty minute period of time. In another example, message grouping module 136 may create a conversation thread based on receiving at least two messages that include common location information (e.g., a check-in by a first user at a Las Vegas resort and a post by a second user including an image of a second user at the same resort), and exchanged between at least two users that share a social connection during a predetermined period of time threshold of at least thirty minutes, or other threshold suitable to indicate that received messages are part of the same conversation.

As discussed in the previous example, message grouping module 136 determines location information by identifying content, including text or images, included in a message associated with a location. Message grouping module 136 also determines location information directly from a message, such as from a post associated with a check-in. And more generally, message grouping module 136 further determines location information of a post based on geographic information about a user's location received by social networking system 100. For example, social networking system 100 may receive a user's location information from a mobile device used by a user to access social networking system 100. In another example, social networking system 100 may receive a user's location information from a third-party, such as a location-based service, or network provider by which the user accesses social networking system 100.

Message grouping module 136 also groups messages into conversation threads by adding new messages to a previously grouped conversation thread. For example, messaging grouping module 136 updates the conversation thread to include new messages generated by participants of the conversation thread that include common location information. In another example, messaging grouping module 136 updates the conversation thread to include new messages that include common location information generated by other users who are connected to participants of the conversation thread. To provide a real-time conversation experience, message grouping module 136 continually updates the conversation thread in real-time, or substantially contemporaneous with a determination that a new message shares common location information with the messages of an existing conversation thread. Along with a further determination that the new message is associated with a user that has an existing social relationship with the existing participants of the conversation thread.

Message grouping module 136 further groups messages by adding messages to an existing conversation thread not previously grouped, such as a conversation thread initiated by a user to exchange messages with another user using a web-chat. In this case, message grouping module 136 identifies the subject matter of the messages to determine if the messages include common location information as previously discussed. Message grouping module 136 also access social information about the participants of the existing thread to determine if other users with which the participants have a social relationship are exchanging messages that also include the determined common location information. To access social information, social networking system 100 may traverse the social graph to identify other users to add the conversation thread based in part on interactions with the participants or other objects that have an edge to one or more participants. With additional users identified, message grouping module 136, may in turn, add one or more of the identified users to an existing conversation when these identified users exchange messages about common location information (e.g., attending a concert, meeting a rally, impromptu study group at an on-campus library, etc.) presently discussed in the existing conversation thread.

Message grouping module 136 further organizes grouped messages within a conversation thread using social information from graph information store 132. As previously discussed, social information is indicative of social relationships between the users of a conversation thread and allows the messages within a conversation thread to be organized by their social relevancy. When a user has a large number of messages in a conversation thread, organizing messages within a conversation thread using social networking information helps to avoid information overload.

In an embodiment, organizing includes categorizing messages within a conversation thread by applying a set of heuristic rules to order messages and/or determine how a message is displayed. For example, one rule may be that if a certain type of social relationship (e.g., friends, family) exists between the participants of a thread, messages associated with participants sharing that certain type of relationship may be listed before messages from other types of participants in the conversation thread. Alternatively or additionally, messages associated with participants sharing a certain type of relationship may be continually displayed with greater persistence compared to other messages within the same conversation thread. In an embodiment, if a social relationship does not exist at all, the message is not included in the conversation thread. Another rule may be that if an affinity between the thread participants exceeds a threshold, the associated messages are displayed before and/or with greater persistence compared to messages from other participants that do not exceed the threshold. Similarly, a further rule may be that if a distance (e.g. degrees of separation) between the participants is less than a threshold, the associated messages are displayed before and/or with greater persistence compared to messages from other participants that do not exceed the threshold.

In an embodiment, message grouping module 136 may organize messages within a conversation thread based in part on a calculated relationship score. For example, the relationship score may be calculated by social networking system 100 as a function of affinity such that a higher affinity results in a higher relationship score. Higher scores (i.e., indicating a strong social relationship between users) indicate that a message is socially relevant, whereas lower scores (i.e., indicating a weak social relationship between users) indicate that a message is less relevant. Messages with relationship scores exceeding a threshold may be ordered or displayed in a position of greater prominence and/or greater persistence within a conversation thread. Messages with scores under a threshold are displayed in a position of lesser prominence and/or lesser persistence, and all other messages are not included in the conversation thread.

In an embodiment, organizing messages within a conversation threads also includes filtering messages within a conversation thread according to social networking information. For instance, a user may select only to view messages within a conversation thread that involve "friends" of the user. In response, for a selected conversation thread, message grouping module 136 presents messages where one or more participants of the thread are friends of the user. Other messages not involving participants that are "friends" are hidden from view.

When a thread has more than two participants, the type of social information used to organize messages for a selected conversation thread may depend directly on which participant the thread is being presented to. For example, if user A, B, and C are participants of a thread, the social relationship between user A and user B may be used to organize messages within the thread for presentation to user A. Additionally or alternatively, the social relationship between user A and user C may also be used to organize messages within a thread for presentation to user A. The social relationship between user B and user C may not be used to organize the messages within a thread for user A because that relationship is irrelevant to user A.

Message grouping module 136 also considers other factors, either alone or in combination with the social information when organizing messages within a conversation thread. These factors may include, but are not limited to:

Whether any messages in the conversation thread contain known spam.

Whether a message is sent by a sender with a bad reputation. A sender may have a bad reputation if the sender has been blocked by other users of social networking system 100.

Whether the message is initiated by an object (e.g., user, page, event, or group) of social networking system 100.

Whether the conversation thread includes messages with attachments.

Whether the message is sent from an e-mail address that the mailbox owner has white-listed or black-listed.

Figure 2:
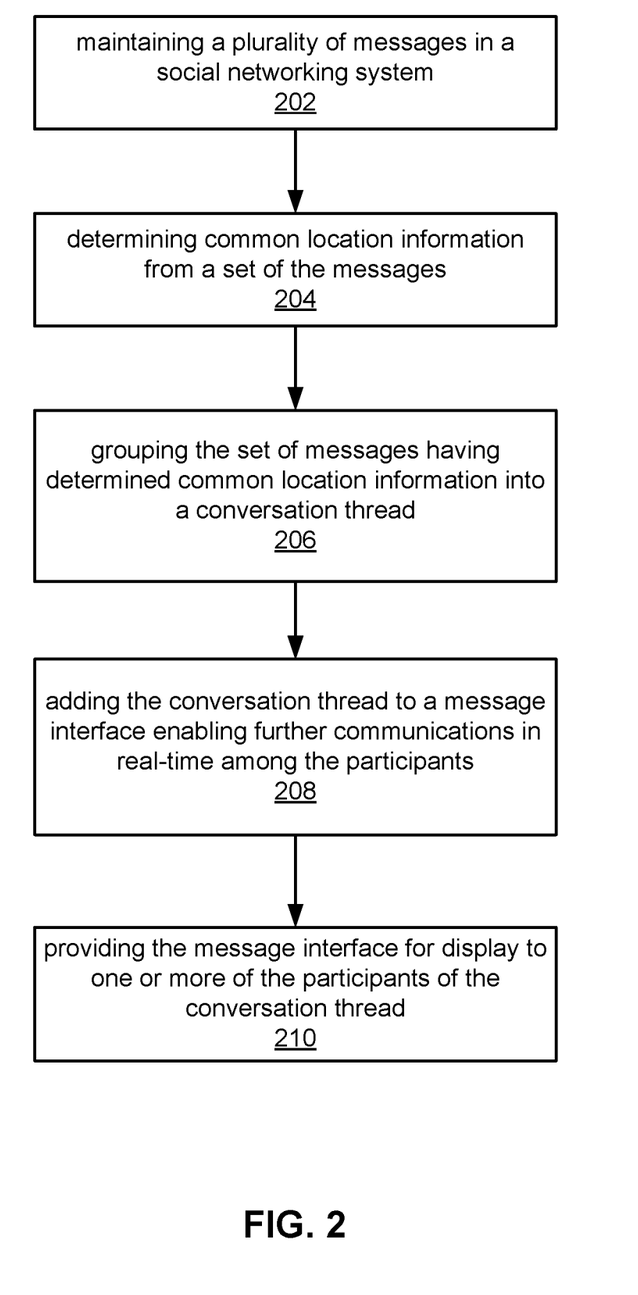
FIG. 2 illustrates a flow chart of a method for presenting a message interface for presenting a conversation thread to a user, according to an embodiment.

FIG. 2 illustrates a flow chart of an exemplary method for presenting a message interface for presenting a real-time conversation thread to a user, according to an embodiment. Social networking system 100 maintains 202 a plurality of messages. Each message is associated with a participant and includes content and metadata as previously described.

To group messages based on location information, social networking system 100 determines 204 common location information from the plurality of messages. In an embodiment, message grouping module 136 observes the content of the received messages, including content referred to (e.g., links) in the messages. In observing the content of the messages, message grouping module 136 semantically analyzes the number and types of words, phrases, sentences, and paragraphs formed by the characters included in the message to determine location information associated with the content. For example, a message sent by user A to user B may be a web-chat that includes content describing the New Year's Eve Masquerade Ball hosted by the San Francisco Symphony. In this example, grouping module 136 identifies the phrase "New Year's Eve Masquerade Ball hosted by the San Francisco Symphony" as location information. And, in turn, groups messages from user A and other users connected to user A and related to the New Year's Eve Masquerade Ball into a conversation thread based on this common location information.

In another embodiment, social networking system 100 determines 204 common location information based in part on geographic information about the user. For example, social networking system may access geographic information about a computing device (e.g., smart phone, tablet computer, desktop computer, etc.) used by the user to access social networking system 100. In another example, social networking system 100 determines common location information by accessing geographic information about the user from a third-party, including a location-based service or network provider providing services over network 150.

Message grouping module 136 groups 206 the set of messages having determined common location information into a conversation thread. The grouped messages are associated with participants that have established a social relationship in social networking system 100. For example, the social relationship represents social information including, an affinity between two or more participants, a type of connection between two or more participants (e.g., personal relationship, familial relationship, professional relationship, etc.). Social information also includes historical information about an interaction between a participant and an object included in the social networking system. For example, historical information may include previous check-in information associated with the location of an event discussed in messages from participants included in the real-time conversation thread. Historical information also includes interaction with a previously grouped conversation thread that included messages from the same or similar group of participants. The social information may be directly retrieved from social graph information store 132. Alternatively, it may be retrieved from a pre-built index of social information that allows for faster retrieval of the social information in graph information store 132.

Message grouping module 136 groups 206 messages into conversation threads when receiving a set of messages from a threshold number of users over a predetermined threshold period of time as previously described in reference to FIG. 1. In some embodiments, message grouping module 136 groups 206 messages, sharing common location information, from a set of participants that have a social relationship on social networking system 100 into a previously existing conversation thread. The previously existing conversation thread will include messages from at least a subset of those participants that have a social relationship with the newly added participants, whose messages include location information common to at least some of the messages included in the previously existing conversation thread.

For example, for a first participant of a conversation thread, message grouping module 136 adds a set of messages to a conversation thread based on social information about the social relationship between the first participant and another participant of the conversation thread. For example, to present a conversation thread about a location socially relevant to a viewing user (i.e., the user to whom a message interface is presented), message grouping module 136 groups messages based in part on common location information and social information as previously described. Messages determined 204 to include common location information may be grouped, and then regrouped based on social information associated with the viewing user. For example, social information includes a degree of connection between the viewing user and another participant in the conversation thread and the viewing user's affinity to another participant in the conversation thread. Social information also includes whether the viewing user and another participant in the conversation thread have established a connection in the social networking system, and the type of connection between the viewing user and another participant of the conversation thread.

Message grouping module 136 adds 208 the conversation thread to a message interface to enable further communications in real-time among the participants. In one embodiment, message grouping module 136 adds 208 the conversation thread to the message interface as the messages are grouped by messaging grouping module 136. And, because messages are grouped in real-time as previously discussed, messaging grouping module 136 may, in turn, add, maintain, and subsequently present a message interface that includes a real-time conversation thread. In another embodiment, message grouping module 136 allows a user to add a conversation thread to the message interface by allowing a user to create a new chat option. To allow a user to create a new chat option, message grouping module 136, presents for display to a user a list of connect users associated with a particular location as determined by common location information included in messages associated with the list of connected users. The list of connected users may be presented to a user with the option for the user to arrange the lists by location or social proximity based on information from graph information store 132.

Message grouping module 136 provides 210 the message interface for display to one or more of the participants of the conversation thread. In an embodiment, the message interface allows the viewing user to select a conversation thread from a list of conversation threads grouped based on location information. The message interface further allows the viewing user to add a message (e.g., a posts, web-chat, etc.) to a selected conversation thread. For example, message interface allows a viewing user to send a post to participants of the conversation thread using a third party application, SMS messages, e-mail, or the like. In an embodiment, message interface further allows a viewing user to create a new conversation thread by presenting the viewing user with a listing of friends sorted by location information. Like existing conversation threads, new conversation threads may also be sorted and/or ranked by location information or social proximity (i.e., by relationship degree relative to the viewing user).

An example message interface will be described in greater detail concerning FIGS. 3 and 4. In an embodiment, the message interface provides selections for a user to list existing conversation threads, and to sort the conversation threads based on social information (i.e., friends or social proximity). In another embodiment, the message grouping module 136 organizes the conversation thread in the message interface using social information that is indicative of relationships between the participants of the thread. In an embodiment, message grouping module 136 also organizes the messages within a conversation thread using the social information. For example, organizing may include sorting or filtering the messages in a conversation thread based on the social information.

In the case where a participant in a conversation thread switches device types during a conversation (e.g., switches from a desktop computer to a mobile device while exchanging messages using web-chat), message grouping module 136 forwards the conversation thread to a message interface on the switched device. In one embodiment, message grouping module 136 switches devices automatically, and without user intervention. For example, social networking system 100 provides one or more signal to message grouping module 136 indicating when a session to access social networking system 100 was commenced and/or terminated by each device associated with a user. Message grouping module 136 may then evaluate these signals to determine whether the period of time between when a session was terminated and when a subsequent session was commenced meets a session switching threshold indicating a user switched devices. For example, a threshold may be less than five minutes between termination of a session and the commencement of a subsequent session. In another embodiment, in addition to the session switching threshold, message grouping module 136 switches devices automatically based in part on a change in location information associated with immediately subsequent sessions.

In another embodiment, message grouping module 136 switches devices based on receipt of a signal from the user indicating a request to switch the message interface to another device. For example, message grouping module 136 may receive a signal indicating that a participant in a conversation thread requests to switch the message interface to another device during a conversation. Responsive to receipt of the request signal, message grouping module 136 displays for selection to the user a list of devices previously used by the user to access social networking system 100.

Figure 3:
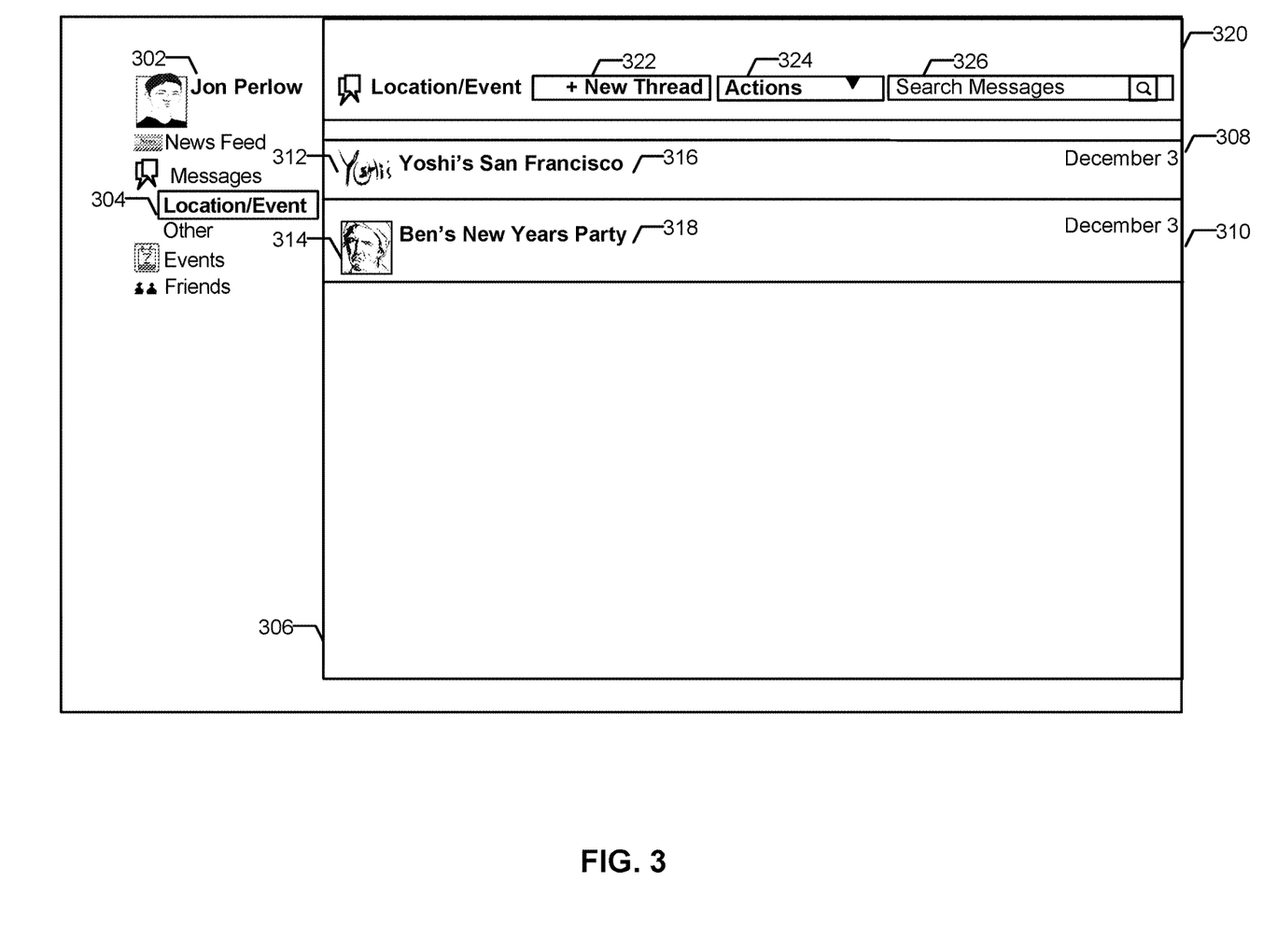
FIG. 3 illustrates a message interface including a listing of conversation threads, according to an embodiment.

FIG. 3 illustrates an exemplary message interface including a listing of conversation threads, according to an embodiment. The message interface is for a user named Jon Perlow 302. Jon has selected 304 to view his location-based messages, which opens up a list 306 of conversation threads (e.g., 308 and 310). The first conversation thread 308 represents a conversation about Yoshi's San Francisco, a jazz club. The second conversation thread 310 represents a conversation about Ben's New Years Eve party, a small get together Ben's home.

For each conversation thread, a brief summary of the conversation is presented in the interface. In an embodiment, the summary includes the names or references to the common location information serving as the subject of the conversation thread, pictures (312 and 314). In another embodiment, and an excerpt (not shown) from the most recent message in the conversation is provided along with the summary. In an embodiment, the summaries are organized by time/date so that conversations with the most recent messages are placed higher in within a list of conversations in the interface.

Message interface also includes header region 320 for receiving a selection from the viewing user to create a new thread 322, perform actions (e.g., sort threads based on social information, hide threads, select persistence for a thread based on location or social information, among other things). Header region 320 also includes an interface 326 for searching for messages in a conversation thread. The interface allows messages to be searched through the use of textual search queries, by entering a query in a search box. Message grouping module 136 processes the query and identifies messages that match the query. The search results are then presented in a list to the viewing user. In an embodiment, the scope of the search can be limited through the use of search options. The search options can be entered in a number of ways, such as with an additional command in the search query or through a list of selectable options. Using the search options, the scope of the search can also be limited in a number of ways. For example, the search can be limited to particular conversation threads or can be an unrestricted search of a user's entire mailbox. Searches can also be restricted by time, user names, message channel (i.e., e-mail or web-chat), etc.

Figure 4:
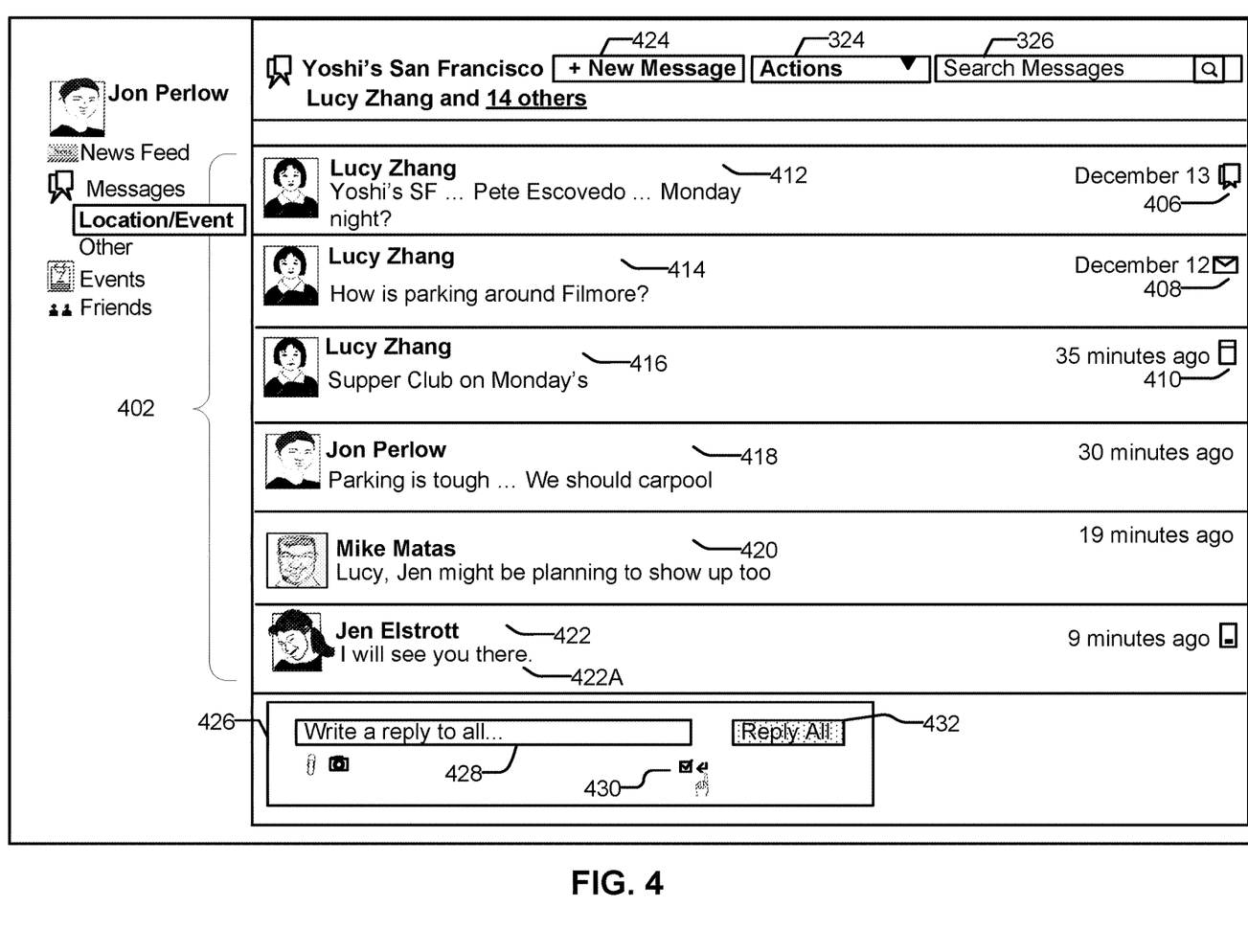
FIG. 4 illustrates a message interface for a conversation thread among more than two users, according to an embodiment.

FIG. 4 illustrates an exemplary message interface for a conversation thread between more than two users, according to an embodiment. The user can reach this display by selecting one of the conversation threads in the interface of FIG. 3. FIG. 4 shows a series of messages included in the Yoshi's San Francisco conversation between viewing user Jon Perlow and other users 402 connected to Jon. In an embodiment, the messages are presented in chronological order, the more recent messages listed below older messages. In another embodiment, messages may be listed by social proximity (e.g., by relationship degree), or by other social information (e.g., affinity, connection type, etc.) by selecting a message display mode using action pull down 324.

Icons within each message indicate a message channel used to deliver the message. Icon 406 indicates that first message 412 is a web-chat message. Icon 408 indicates that the second message 414 is an e-mail message. Icon 410 indicates that the third message 416 is a SMS text message sent from a phone. In an embodiment, the conversation thread is updated in real-time as new messages are received. In operation, a conversation thread is akin to a historical record of correspondence about a location between a set of users sharing some social relationship. Through the interface, a viewing user can scroll backwards in time to view the entire history of the messages in the conversation thread. In an embodiment, some of the messages can have attachments such as pictures, videos, documents, etc. The pictures and video can be shown in the interface with a preview of the attachment instead of just a link to the attachment. For example, an attached picture can be shown in the interface with a thumbnail of the picture.

The conversation thread also includes both outgoing and incoming messages. For example, the conversation thread in FIG. 4 includes message 418, which is a message sent by the viewing user Jon Perlow. The conversation thread also includes message 422, which is a message sent to user Mike Matas from user Jen Elstrott in response to Mike's message 420. Mike having a first-order connection with Jen, and Jen having a first-order connection with Jon.

In an embodiment, conversation threads that have more than two participants behave like chat rooms. A conversation participant can send a message to the conversation thread, which is then distributed by message grouping module 136 to all conversation participants. In an embodiment, object store 110 includes a profile for each user that comprises a profile name, an e-mail address, a profile picture, and other identifying information. In an embodiment, the name of a participant as displayed in the summary is identified from the participant's profile. For example, an e-mail received from Lucy.Zhang@yahoo.com can be identified from information in object store 110 as being an e-mail from the user Lucy Zhang.

When a conversation thread has a large number of participants, in an embodiment only a sub-set of the participant names are presented to simplify the summary. The sub-set can be any number of participants from the conversation. For example, conversation thread 308 has fourteen participants. Only the names of four conversation participants (Lucy Zhang, Jon Perlow, Mike Matas, and Jen Elstrott) are displayed. The name of the mailbox owner is not shown in the summary. The names of the other two participants are grouped together and presented as "14 others." Message grouping module 136 selects the sub-set of names in any of a number of ways. For example, the sub-set may include the names of the participants who created the most recent messages in the conversation, the name of the participant who started the conversation, or the names of the participants that the viewing user has the strongest affinity for or social relationship with.

In an embodiment, the brief excerpt 422A may be extracted from the content of the most recent message in the conversation thread. For example, in conversation thread 308, the excerpt 422A includes the text "I will see you there," which is the most recent message from this conversation thread 308. In other embodiments, the brief excerpt is extracted from other information that is not message content, such as metadata associated with the message. For example, the brief excerpt could be the title of the most recent e-mail message in the conversation.

In an embodiment, the message interface also includes quick reply bar 426 for sending messages and adding messages to a conversation thread. For example, quick reply bar 426 is used for sending either text-based messages or attachments to participants of a conversation thread. As shown in FIG. 4, quick reply bar 426 is placed below a conversation thread at the bottom of the interface. In an embodiment, quick reply bar 426 is placed anywhere in the interface and does not necessarily have to be placed directly below the conversation thread.

Quick reply bar 426 includes a text entry box 428 and a mode selection box 430. Text entry box 428 is an element of the interface that accepts message text for updating the conversation thread. The quick reply bar can operate in two different messaging modes: quick reply mode or standard mode. The mode can be selected by toggling mode selection box 430 in quick reply bar 426. Mode selection box 430 thus allows a user to switch between the quick reply mode and the standard mode or to select a particular mode of operation. In other embodiments, more than two message modes are supported by quick reply bar 426, and mode selection box 430 allows the user to switch between any of the modes. In other embodiments, text entry box 428 and mode selection box 430 have a different appearance than that shown in FIG. 4.

The quick reply mode is similar to an instant messaging mode for sending messages. When operating in quick reply mode, a user can enter a message in text entry box 428 and send it by pressing the enter key. This allows for messages to be sent with keyboard-based input without requiring the user to switch between a keyboard and a mouse, allowing for a quicker reply. The message is sent to message grouping module 136 for adding the message to the conversation thread and updating the message interface with the new message. Any message text in the text entry box 428 is also cleared out to allow the user to start typing a new message.

In an embodiment, when operating in non-quick reply (standard mode), reply all button 432 is provided for sending messages. Reply all button 432 is an interface element that can be selected with a mouse click. In an embodiment, reply all button 432 is only be shown when operating in the standard mode but hidden during the quick reply mode.

When operating in a non-quick reply (standard) mode, pressing the enter key does not send the message. Instead, pressing the enter key has the effect of generating a carriage return and moves the cursor below the current line of text in the text entry box 428, similar to how pressing the enter key when writing an e-mail creates another line of text. This method of sending messages may be slower because it requires the use of a mouse, but is preferable for some users. Additionally, this also allows for the creation of more complex and longer messages that have multiple lines of text and spaces in-between the lines.

In an embodiment, the settings for quick reply bar 426 are persistent. As the viewing user moves from one conversation thread to the next, the settings for the quick reply bar 426 are maintained. For example, if the mailbox owner sets the quick reply bar 426 to a standard mode when viewing one conversation thread and then switches to viewing a different conversation thread, quick reply bar 426 will remain in standard mode. Additionally, to add a new message to a conversation thread, the viewing user may select new message 424, which generates an interface to compose a message to a current participant in the conversation thread or a non-participant, which has a social relationship with the viewing user. In an embodiment, the generated interface may be any suitable interface to send a message to another user of social networking system 100.

Figure 5:
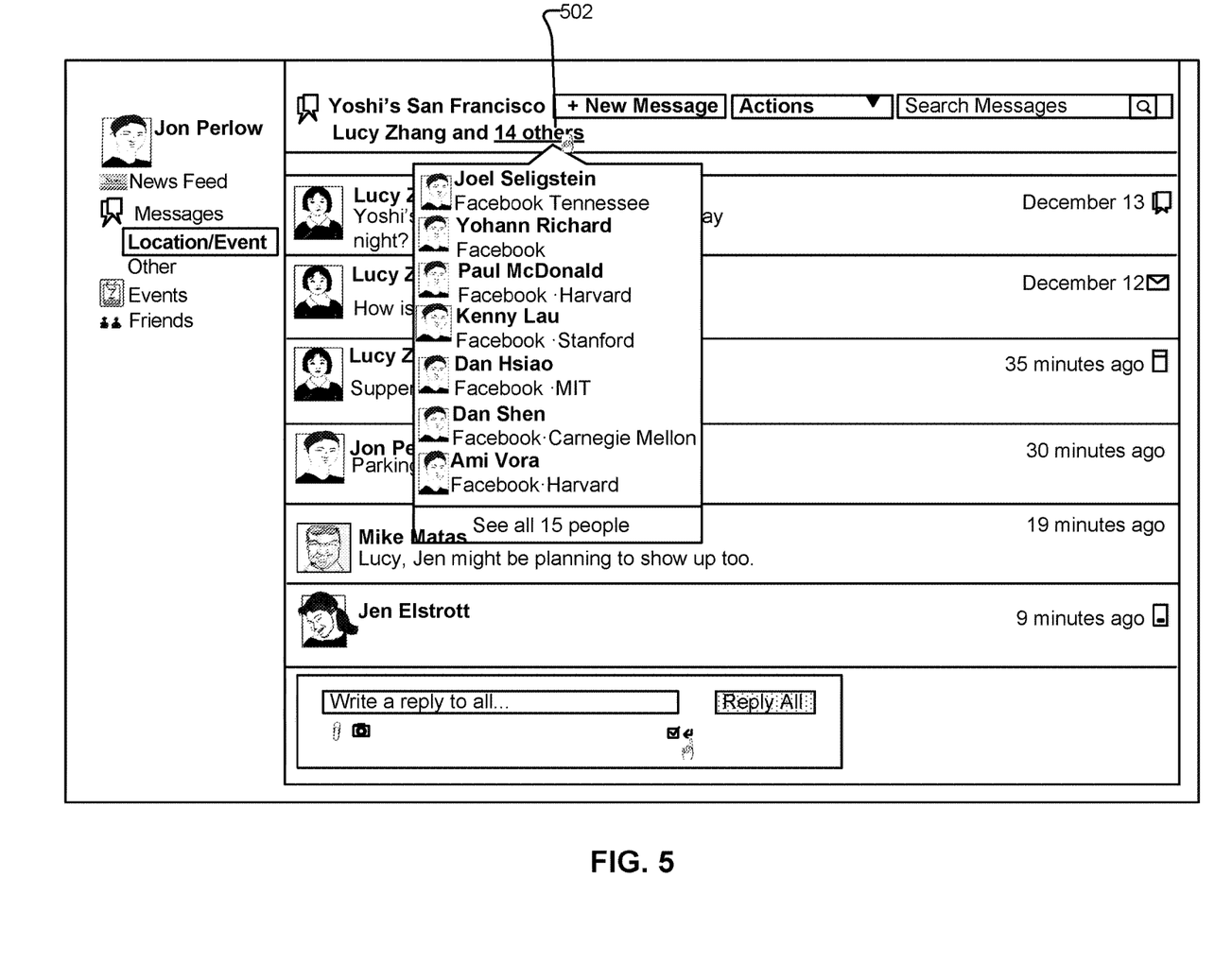
FIG. 5 illustrates another message interface for a conversation thread among more than two users, according to an embodiment.

FIG. 5 illustrates another exemplary message interface for a conversation thread between more than two users, according to an embodiment. As shown in FIG. 5, the viewing user has selected the text for the fourteen other participants 502 in the conversation thread. In response, a list of participants is displayed. Each participant is displayed along with a name, a picture, and other identifying information such as an employer and college. As the entire list of fourteen participants is too long to be displayed at once, only a sub-set of seven participants is presented in the interface.

Additional Considerations

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the embodiments to be limited not by this detailed description, but rather by any claims that issue on an application based hereon. Accordingly, this disclosure is intended to be illustrative, but not limiting, of the scope of the embodiments, which is set forth in the following claims.

What is claimed is:

1. A method comprising:
receiving a set of one or more messages between a set of participants who are users of a messaging system;
receiving an additional set of one or more messages between an additional set of participants who are users of the messaging system;
determining commonly specified location information in the set of messages and the additional set of messages;
selecting messages from the set of messages and from the additional set of messages having the commonly specified location information based on the determining;
combining the selected messages from the set of messages and from the additional set of messages into a conversation thread;
identifying one or more messages from the conversation thread associated with participants from the set or from the additional set to whom a viewing participant of the conversation thread has established a connection via the messaging system;
sorting the identified messages based on social relationships maintained by the messaging system between the viewing participant and participants from the set or from the additional set associated with the identified messages, the sorting comprising:
 determining affinities of the viewing participant and participants from the set or from the additional set; and
 arranging the identified messages in an order based on the determined affinities;
generating a message interface including the sorted identified messages to the viewing participant of the conversation thread, the sorted identified messages ordered within a display space in the message interface according to the sorting, and the message interface configured to communicate messages from the viewing participant and participants associated with the identified messages in the conversation thread;
sending the message interface for display to a client device of the viewing participant of the conversation thread.

2. The method of claim 1, wherein sorting the identified messages based on social relationships maintained by the social networking system between the viewing participant and participants from the set or from the additional set associated with the identified messages further comprises:
determining types of connections between the viewing participant and each participant from the set or from the additional set maintained by the messaging system; and
sorting the identified messages based on the determined types of connections.

3. The method of claim 1, wherein sorting the identified messages based on social relationships maintained by the social networking system between the viewing participant and participants from the set or from the additional set associated with the identified messages further comprises:
determining degrees of connections between the viewing participant and each participant from the set or from the additional set maintained by the messaging system; and
sorting the identified messages based on the determined degrees of connections.

4. The method of claim 1, wherein sorting the identified messages based on social relationships maintained by the social networking system between the viewing participant and participants from the set or from the additional set associated with the identified messages further comprises:
determining historical interactions between the viewing participant and each participant from the set or from the additional set maintained by the messaging system; and
sorting the identified messages based on the determined historical interactions.

5. The method of claim 1, wherein determining location information specified in the set of messages and the additional set of messages comprises:
receiving user location information associated with one or more participants of the set and one or more participants of the additional set of messages.

6. The method of claim 1, wherein combining the selected messages from the set of messages and from the additional set of messages into a conversation thread comprises:
   combining the set of messages and the additional set of messages when the set of messages and the additional set of messages are associated with at least a threshold number of users and received over a threshold period of time.

7. The method of claim 1, further comprising:
   sorting the messages included in the message interface based on the commonly specified location information.

8. The method of claim 1, wherein the message interface includes a list of conversation threads.

9. The method of claim 1, wherein the message interface is a chat interface.

10. The method of claim 1, further comprising:
    receiving a selection of the conversation thread from the message interface;
    responsive to receiving the selection of the at least one conversation thread, presenting one or more message included in the conversation thread; and
    receiving, from an additional participant, a message to include in the conversation thread, the received message including commonly specified location information and being associated with the additional participant.

11. The method of claim 10, wherein the additional participant has one degree of separation from a subset of the set of and of the additional set of participants and has greater than one degree of separation from another subset of the set and of the additional set of participants.

12. A computer program product comprising a non-transitory computer readable storage medium having instructions encoded thereon that, when executed by a processor, cause the processor to:
    receive a set of one or more messages between a set of participants who are users of a messaging system;
    receive an additional set of one or more messages between an additional set of participants who are users of the messaging system;
    determine commonly specified location information in the set of messages and the additional set of messages;
    select messages from the set of messages and from the additional set of messages having the commonly specified location information based on the determining;
    combine the selected messages from the set of messages and from the additional set of messages into a conversation thread;
    identify one or more messages from the conversation thread associated with participants from the set or from the additional set to whom a viewing participant of the conversation thread has established a connection via the messaging system;
    sort the identified messages based on social relationships maintained by the social networking system between the viewing participant and participants from the set or from the additional set associated with the identified messages, the sort comprising:
       determine affinities of the viewing participant and participants from the set or from the additional set; and
       arrange the identified messages in an order based on the determined affinities;
    generate a message interface including the sorted identified messages to the viewing participant of the conversation thread, the sorted identified messages ordered within a display space in the message interface according to the sort, and the message interface configured to communicate messages from the viewing participant and the participants associated with the identified messages in the conversation thread;
    send the message interface for display to a client device of the viewing participant of the conversation thread.

13. The computer program product of claim 12, wherein sort the identified messages based on social relationships maintained by the social networking system between the viewing participant and participants from the set or from the additional set associated with the identified messages further comprises:
    determine types of connections between the viewing participant and each participant from the set or from the additional set maintained by the messaging system; and
    sort the identified messages based on the determined types of connections.

14. The computer program product of claim 12, wherein sort the identified messages based on social relationships maintained by the social networking system between the viewing participant and participants from the set or from the additional set associated with the identified messages further comprises:
    determine degrees of connections between the viewing participant and each participant from the set or from the additional set maintained by the messaging system; and
    sort the identified messages based on the determined degrees of connections.

15. The computer program product of claim 12, wherein sort the identified messages based on social relationships maintained by the social networking system between the viewing participant and participants from the set or from the additional set associated with the identified messages further comprises:
    determine historical interactions between the viewing participant and each participant from the set or from the additional set maintained by the messaging system; and
    sort the identified messages based on the determined historical interactions.

16. The computer program product of claim 12, wherein determine location information specified in the set of messages and the additional set of messages comprises:
    receive user location information associated with one or more participants of the set and one or more participants of the additional set of messages.

17. The computer program product of claim 12, wherein combine the selected messages from the set of messages and from the additional set of messages into a conversation thread comprises:
    combine the set of messages and the additional set of messages when the set of messages and the additional set of messages are associated with at least a threshold number of users and received over a threshold period of time.

* * * * *